L. P. WHITAKER.

WROUGHT METAL RING FOR PIPE COUPLINGS.

APPLICATION FILED DEC. 30, 1912.

1,061,712.

Patented May 13, 1913.

2 SHEETS—SHEET 1.

WITNESSES

H. F. Doyle.

Robt. E. Barry.

INVENTOR

L. P. Whitaker

By Whitaker & Prevost

Attorneys

L. P. WHITAKER.
WROUGHT METAL RING FOR PIPE COUPLINGS.
APPLICATION FILED DEC. 30, 1912.
1,061,712.
Patented May 13, 1913.
2 SHEETS—SHEET 2.
FIG. 3.
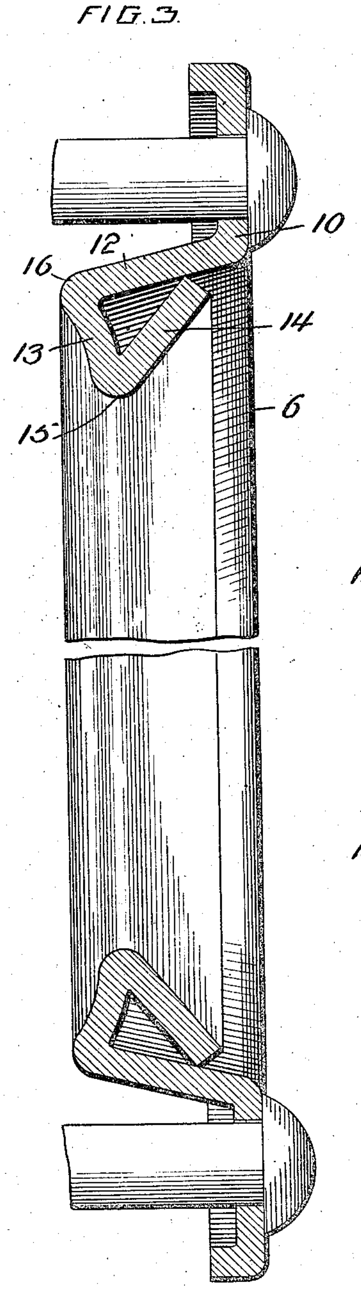
FIG. 4.
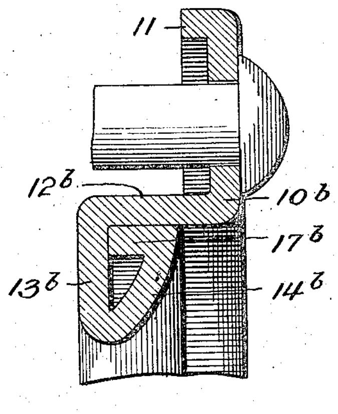
FIG. 5.
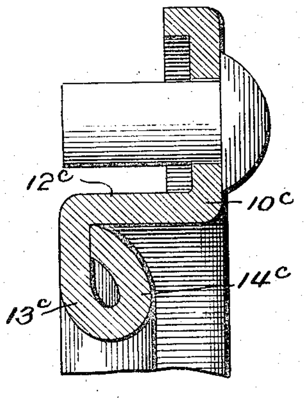
FIG. 6.
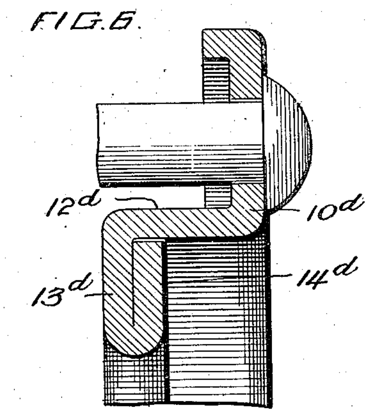
FIG. 7.
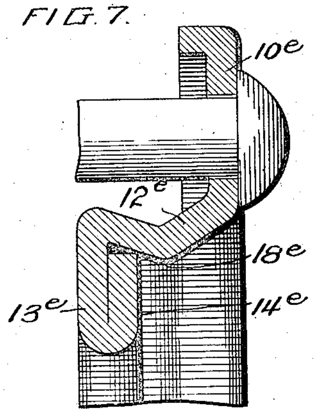
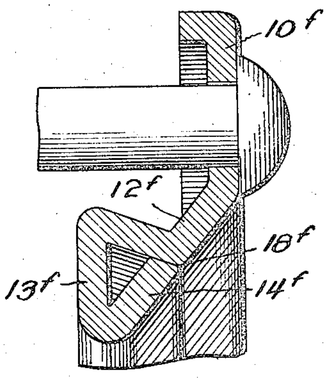
FIG. 8.
WITNESSES
Wm F. Koyle.
Robt. G. Barry.
INVENTOR
L. P. Whitaker
By Whitaker & Prevost
Attorneys

UNITED STATES PATENT OFFICE.

LOUIS PREVOST WHITAKER, OF NEW YORK, N. Y., ASSIGNOR TO S. R. DRESSER MANUFACTURING COMPANY, OF BRADFORD, PENNSYLVANIA, A CORPORATION OF PENNSYLVANIA.

WROUGHT-METAL RING FOR PIPE-COUPLINGS.

1,061,712. Specification of Letters Patent. Patented May 13, 1913.

Application filed December 30, 1912. Serial No. 739,420.

*To all whom it may concern:*

Be it known that I, LOUIS P. WHITAKER, a citizen of the United States, residing at New York, in the county of New York and State of New York, have invented certain new and useful Improvements in Wrought-Metal Rings for Pipe-Couplings; and I do hereby declare the following to be a full, clear, and exact description of the invention, such as will enable others skilled in the art to which it appertains to make and use the same.

My invention relates to the manufacture of wrought metal rings for use in connection with pipe couplings, but the invention is applicable to rings for other purposes.

In the accompanying drawings I have shown an embodiment of my invention selected by me for purposes of illustration and several modifications thereof and adapted particularly for use in connection with clamps for bell and spigot pipes, but the invention is not limited to rings constructed for this purpose.

Figure 1:
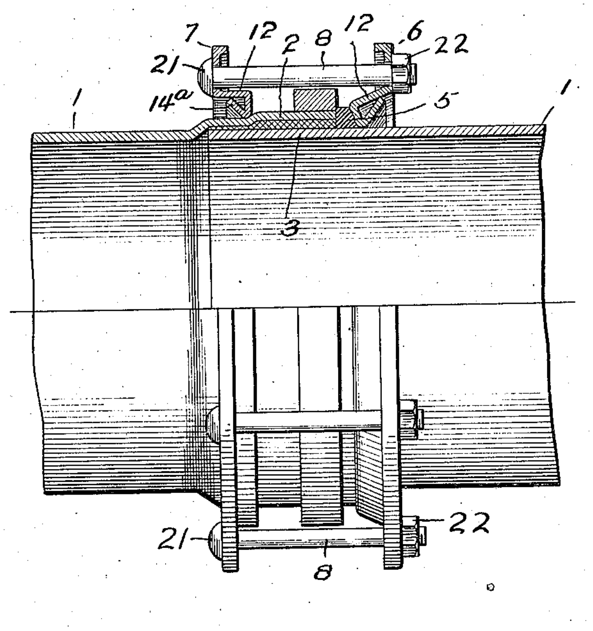
Figure 2:
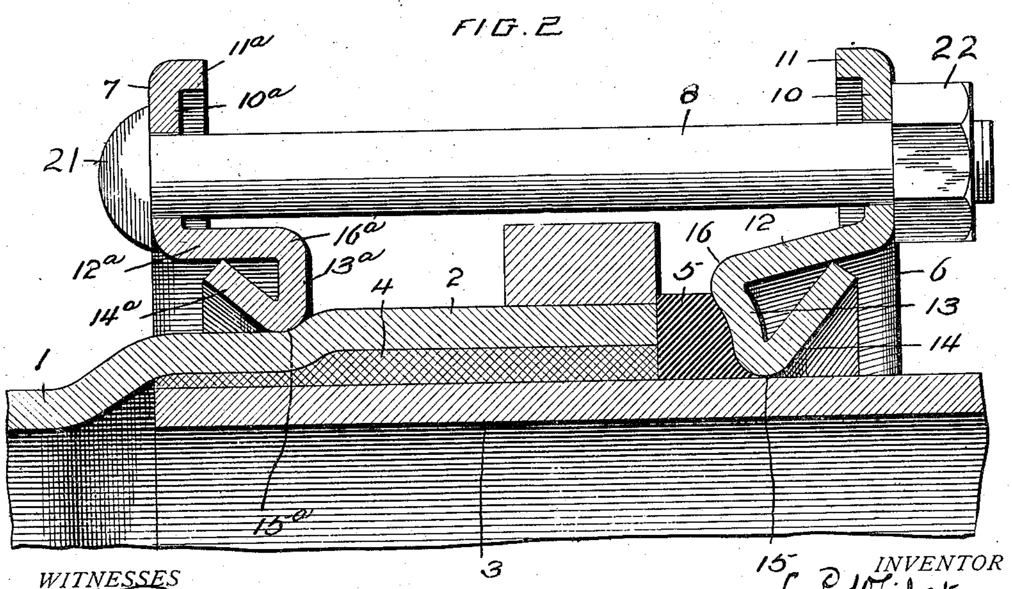

In the said drawings, Figure 1 represents a side elevation partly in section of a Matheson joint provided with a clamp, the clamping ring and "bull ring" of which embody my invention. Fig. 2 is a partial sectional view of the same drawn to a larger scale. Fig. 3 is a sectional view of the clamping ring on the same scale as Fig. 2, portions of the ring being broken away. Figs. 4 to 8 inclusive are detail sectional views of modified forms of my improved ring.

The bell and spigot joint of which the well known "Matheson" joint illustrated in Figs. 1 and 2, is an example, comprises two pipe sections 1, 1, each provided at one end with an enlarged portion or bell 2 to receive the plain end of spigot 3 of the other section, the space within the bell surrounding the spigot being filled with a non-elastic packing 4, such as lead, cement or the like. In order to insure that these joints will not work loose and leak, it is customary to apply to them a clamp which comprises an elastic packing ring usually of rubber 5 to surround the spigot 3 and engage the mouth of the bell 2 and the non-elastic packing 4, a clamping ring or packing engaging ring 6 to force the packing against the bell and spigot, a "bull ring" 7 to engage the exterior of the bell and afford an abutment for bolts 8, 8 which connect the rings 6 and 7 and enable the packing to be properly compressed. The greatest strain on the packing engaging ring 6 is obviously in the direction of the axis of the ring. The "bull ring," however, is not only subjected to this strain but also to a strain in a direction perpendicular to the axis of the ring, by reason of the fact that the bell end acts like a taper plug and tends to enlarge the pipe opening of the ring.

One of the objects of my invention is to provide a ring which is so formed as to be thoroughly reinforced against both these strains, and which can, therefore, be used for either the packing engaging ring or the bull ring of such a clamp, it being understood that the bull ring will of necessity be made with a larger pipe aperture than the packing engaging ring of the same clamp.

In carrying out my invention, I bend up the inner marginal portions of the annular blank from which the ring is preferably formed in such manner as to cause it to reinforce the ring structure as hereinafter described.

The preferred form of my invention is illustrated in Figs. 1, 2 and 3 in which Figs. 1 and 2 show both the packing engaging ring and the "bull" ring embodying my invention. The packing engaging ring shown in Figs. 1 and 2 at the right and in Fig. 3 is formed preferably from a flat annular blank of sheet steel, or iron, such as boiler plate or other sheet metal, and is pressed into shape by the action of suitable dies, or otherwise. This ring 6 comprises an annular plate member 10, provided with a plurality of bolt holes, and having preferably a stiffening flange 11 at its outer edge. An annular wall 12 extends from the inner edge of the plate member 10 and may be disposed substantially perpendicular to the plane of the plate member or slightly oblique thereto. From the end of said annular wall opposite the end which joins the plate member is an inwardly extending flange 13 and the inner marginal portions of the blank are bent outward from the inner edge of flange 13, and backward toward the said annular wall, forming an internal reinforcing flange 14, the outer edge of which preferably engages and is pressed into contact with the annular wall 12 between its ends and preferably adjacent to the junction of said wall with the plate member, so that any strain exerted on the flange 13 either outwardly, or in the direction of the axis of the ring will be transmitted to the annular wall and to the plate member by the reinforcing flange 14. The pipe aperture is formed obviously at the junction 15 of the flanges 13 and 14 and the bends 15 and 16 at the inner and outer edges of the flange 13 will also greatly stiffen the structure of the ring. When the ring is to be used as the packing engaging ring, the outer face of the flange 13 will engage the packing, that is to say, the face more remote from the plate member, and I prefer to slightly bend or curve the flange 13, annularly as shown, so that the portion thereof adjacent to the pipe aperture will be nearer the plane of the plate member than the part which is adjacent to the annular wall 12, thus forming an annular bead at the junction 16 of flange 13 and wall 12, the inclined or curved packing engaging face serving to press the packing toward the pipe, as well as toward the bell mouth, but this is not essential, as flange 13 may be disposed substantially or actually perpendicularly to the axis of the ring, as shown in the case of the "bull" ring 7.

The "bull" ring 7 is formed in the same manner as the ring 6 as shown in Fig. 1, the parts being given corresponding reference numerals with the addition of the exponent "a," except that the diameter of the pipe aperture is sufficiently larger than that of the clamping ring, to permit it to engage the bell end of the joint, and inwardly extending flange, marked $13^a$ may be straight as shown. In the case of the "bull ring" 7 it will be noted that the reinforcing flange serves an additional purpose in strengthening the ring to resist expansion in a direction perpendicular to the axis of the ring, caused by the wedging action of the bell end.

A plurality of bolts 8 are employed to connect the "bull" ring 7 and clamping ring 6 and passing through the corresponding bolt holes in said rings, said bolts having each a head 21 at one end and a nut 22 at the other and by turning up the nuts the clamping ring is caused to compress the packing ring 5 to prevent the possibility of leakage of the joint.

In Figs. 4 to 8 inclusive I have shown sectional views of several modifications within the scope of the invention, which may be used for either the clamping ring or bull ring as desired by forming them with the required diameters. In the form shown in Fig. 4, $10^b$ represents the plate member, $12^b$ the annular wall, and $13^b$ the inwardly extending flange, from the inner end of which the reinforcing flange $14^b$ extends outwardly and is provided with an annular flange $17^b$ which lies in contact with and parallel to the annular wall and has its lower edge in engagement with the flange $13^b$. In the form shown in Fig. 5, the plate member $10^c$ and annular wall $12^c$ are of the form previously described. The metal forming the inwardly extending flange $13^c$ is bent in a curve over back upon said flange, forming the reinforcing flange $14^c$, which has its outer edge engaging the annular wall $12^c$ at its junction with flange $13^c$. In Fig. 6 a ring of the same general form as that in Fig. 5 is shown, except that the reinforcing flange $14^d$ is bent sharply back upon and lies flat upon the inwardly extending flange $13^d$. In Fig. 7 the plate member $10^e$ is provided with an annular wall $12^e$ having an angular shape, that is to say being bent inward so that it forms two portions united centrally to form an angle or shoulder $18^e$, which further stiffens the metal of the said wall. The inwardly extending flange $13^e$ extends from the end of said wall and the reinforcing flange $14^e$ is bent sharply back upon the flange $13^e$. In Fig. 8 a form similar to that shown in Fig. 7 is illustrated, in that the wall $12^f$ extending from the inner edge of the plate member $10^f$ is bent inwardly about centrally to form the annular shoulder $18^f$, but in this case the reinforcing flange $14^f$ which extends from the inner edge of the annular flange $13^f$, extends in line with that portion of the annular wall adjacent to the plate member and engages the said wall at the central shoulder $18^f$, so that any strain upon the reinforcing member $14^f$ is transmitted directly to the wall $12^f$ and through the portions thereof in line with the reinforcing member, to the plate member in a straight line.

In all of the forms herein shown and described, it will be noted that the reinforcing flange is formed by bending up the inner marginal portions of the annular blank from the inner edge of the inwardly extending flange, and in all the forms shown the outer extremity of the reinforcing flange is brought preferably into contact with the annular wall either adjacent to or at a distance from its junction with the inwardly extending flange.

While I prefer to form all of the rings herein shown from a flat annular blank of sheet metal which is pressed into shape by suitable dies, I do not limit myself to this method of forming the ring or rings, as they may be forged by hand or made in other ways if found desirable.

It will be noted that the portion of my improved ring which forms the reinforcing flange is located at the inner part of the same, so that if the ring is formed from a flat sheet metal blank as preferred, the nonforcing flange is formed from the inner marginal portion of the blank, and the blank itself is not increased in its exterior diameter in providing the metal for said reinforcing flange and the blank can be cut from a piece of metal of the same area, as would be employed in making a ring not so reinforced. This is important from an economic standpoint, as the central portion of that part of a sheet of metal from which the blank is cut, must of necessity be cut out, and is relegated to the scrap heap unless it is of such size that it can be utilized for a blank for smaller sizes, and to do this usually requires that it be re-rolled to bring it to the desired thickness for a smaller ring. In making the rings according to my invention a portion of this practically waste material is utilized in strengthening the ring, and as a thinner sheet can be used for the entire ring than where the ring is not so reinforced, economy of manufacture results.

What I claim and desire to secure by Letters Patent is:

1. A wrought metal ring for use in pipe couplings comprising an annular plate member, an annular wall, extending from the inner edge thereof and terminating in an inwardly extending annular flange and an annular reinforcing flange extending from the inner edge of the said inwardly extending flange, outwardly toward the said annular wall said reinforcing flange being located on the side of said inwardly extending flange nearer the plane of the plate member.

2. A wrought metal ring for use in pipe couplings comprising an annular plate member, an annular wall, extending from the inner edge thereof and terminating in an inwardly extending annular flange, and an annular reinforcing flange extending from the inner edge of the said inwardly extending flange outwardly and having its outer edge in contact with said annular wall.

3. A wrought metal ring for use in pipe couplings comprising an annular plate member, an annular wall, extending from the inner edge thereof and terminating in an inwardly extending annular flange, and an annular reinforcing flange extending from the inner edge of the said inwardly extending flange outwardly and having its outer edge in contact with said annular wall at a distance from the junction of said wall and said inwardly extending flange.

4. A wrought metal ring for use in pipe couplings comprising an annular plate member, an annular wall extending from the inner edge thereof and terminating in an inwardly extending annular flange, and an annular reinforcing flange extending from the inner edge of the said inwardly extending flange outwardly toward said wall, said wall having the portion adjacent to the plate member disposed angularly to the portion adjacent to the said inwardly extending flange.

5. A wrought metal ring for use in pipe couplings comprising an annular plate member, an annular wall, extending from the inner edge thereof and terminating in an inwardly extending annular flange, and an annular reinforcing flange extending from the inner edge of the said inwardly extending flange outwardly toward said wall said wall having the portion adjacent to the plate member disposed angularly to the portion adjacent to the said inwardly extending flange to form an internal shoulder, and said reinforcing flange being disposed in line with that portion of said wall adjacent to the plate member and having its outer edge in engagement with said shoulder.

In testimony whereof I affix my signature in the presence of two witnesses.

LOUIS PREVOST WHITAKER.

Witnesses:

CHARLES A. COLLINS,
E. W. WYATT.